United States Patent [19]
Brown

[11] Patent Number: 5,487,767
[45] Date of Patent: Jan. 30, 1996

[54] RADIALLY SEALED AIR FILTERS

[75] Inventor: Johnny M. Brown, Moore, Okla.

[73] Assignee: Dana Corporation, Toledo, Ohio

[21] Appl. No.: 380,316

[22] Filed: Jan. 30, 1995

Related U.S. Application Data

[63] Continuation of Ser. No. 129,393, Sep. 30, 1993, abandoned.

[51] Int. Cl.$^6$ .................................................. B01D 46/00
[52] U.S. Cl. ............................... 55/357; 55/482; 55/498; 55/502; 55/510
[58] Field of Search ............................... 55/357, 478, 480, 55/482, 498, 502, 510

[56]  References Cited

U.S. PATENT DOCUMENTS

| | | | |
|---|---|---|---|
| 3,147,100 | 9/1964 | Wilber | 55/510 |
| 3,201,927 | 8/1965 | Wachter | 55/510 |
| 3,616,618 | 11/1971 | Gronholz et al. | 55/510 |
| 3,745,753 | 7/1973 | Risse | 55/502 |
| 4,197,101 | 4/1980 | Cote, Jr. et al. | 55/502 |
| 4,222,755 | 9/1980 | Grotto | 55/502 |
| 4,500,332 | 2/1985 | Gillingham | 55/482 |
| 5,071,456 | 12/1991 | Binder et al. | 55/510 |
| 5,167,683 | 12/1992 | Behrendt et al. | 55/502 |
| 5,211,846 | 5/1993 | Kott et al. | 55/502 |

FOREIGN PATENT DOCUMENTS

| | | | |
|---|---|---|---|
| 0401471 | 12/1990 | European Pat. Off. | 55/502 |
| 2852385 | 1/1980 | Germany | 55/510 |
| 1611386 | 12/1990 | U.S.S.R. | 55/357 |

*Primary Examiner*—C. Scott Bushey
*Attorney, Agent, or Firm*—Millen, White, Zelano, & Branigan

[57]  ABSTRACT

An improvement in filter construction, wherein the filter has a metal end cap affixed over the front end of corrugated filtering material within the filter, the metal end cap having a radially extending portion and inner and outer axially extending portions with one of the axially extending portions being longer than the other. Plastisol is used to bond the metal end cap to the end face of the corrugated filtering material and a seal of vulcanized rubber having a hardness of 35 to 40 durometer is bonded to the outside surface of the end cap. The opposite end of the filter is closed with a circular metal pan bonded thereto with plastisol. A loop is pivoted on the circular metal pan to facilitate withdrawing the filter from a filter housing after the filter has been used for a prescribed period of time or has become clogged.

11 Claims, 7 Drawing Sheets

5,487,767

RADIALLY SEALED AIR FILTERS

This application is a continuation of application Ser. No. 08/129,393, filed Sep. 30, 1993 now abandoned.

FIELD OF THE INVENTION

This invention relates to improvements in radially sealed air filters. More particularly, this invention is directed to improvements in radially sealed air filters useful for filtering air delivered to internal combustion engines.

BACKGROUND ART

Heavy transportation, agricultural and construction equipment frequently rely on large diesel engines for power. It is important that clean air be delivered to these engines for combustion. Generally, one type of air cleaner for this purpose utilizes coaxial primary and secondary air filters, wherein the secondary air filter is nested within the primary air filter. Air is drawn from the atmosphere, radially through the primary and secondary filters and into the cylindrical space within the secondary filter. The filtered air then passes to the engine for mixture with fuel in the combustion chamber of the engine.

In order to ensure proper filtering of combustion air, the primary and secondary air filters are sealed within a housing by an arrangement of radial and axial sealing elements and gaskets. In one prior art approach, sealing of the filters is accomplished by compressing the outlet end of the filter against the end wall of the housing and by providing a gasket between the end of the filter and the end wall of the housing. This is accomplished by, for example, utilizing a yoke assembly which cooperates with a threaded wing nut, the nut being used to compress the filters against the end wall of the housing to prevent leakage of air around the filter elements. In the past, various other latches and clamping devices have been used to effect a positive clean air seal with such filter assemblies.

Axial compression techniques for sealing require filters which are constructed so as not to collapse under compression. In prior art devices, this required the use of relatively heavy gauge steel housings to withstand the compressive pressures. Because both the filter housing and filter must be strong and rigid when using such techniques, the development of low cost., light weight filters in housings has been hampered. Accordingly, relatively expensive housings, as well as relatively expensive molding processes were utilized which, of course, increased the costs of the filter assemblies. Since filter assemblies are disposable after use, the expensive investment in these materials and processes does not result in extended filter life, but rather simply increases the cost of filters. The effect of filter expense is continuous since the expense of filters discourages their timely replacement which, of course, results in decreased engine life which, in turn, results in equipment being retired or overhauled early, an undesirable consequence in and of itself.

U.S. Pat. No. 4,720,292 to Engel et al. addresses the problem with relatively soft, radially directed end seals. In practice, the arrangement disclosed in this patent requires a plastic clip placed in the housing to push the filter inward for a tighter seal. Since the end cap of the Engel et al. patent is polyurethane, the end cap is relatively soft, resulting in a relatively weak, compressible seal which feels to the installer to be less effective than it might be.

In view of these considerations, there is a need for a new and improved sealing end cap arrangement which still allows use of relatively inexpensive filter housings and retaining structures while providing an effective seal which will last at least as long as the filter material.

SUMMARY OF THE INVENTION

In view of the foregoing considerations, it is a feature of the instant invention to provide a new and improved end seal structure for filters, especially useful in filter arrangements having a primary and secondary filter with the secondary filter coaxially nested within the primary filter.

The instant invention is directed to an filter improvement comprised of an annular element of filtering material disposed between a pair of concentric screens. The annular filter element has radially extending first and second end faces and is suitable for mounting in a housing having a bottom and a cover with an axially extending circular projection extending therefrom into the housing. A metallic end cap having a radially extending annular portion fits over the first end face of the filter element. The metallic end cap also includes a radially, inner, axially extending portion .and a radially outer, axially extending portion which fit over the concentric screens. A layer of adhesive is disposed between the radial portion of the metallic end cap and the end face of the filter element for bonding the metallic end cap to the filter element. A seal of vulcanized rubber material overlies the metallic end cap and is bonded thereto.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
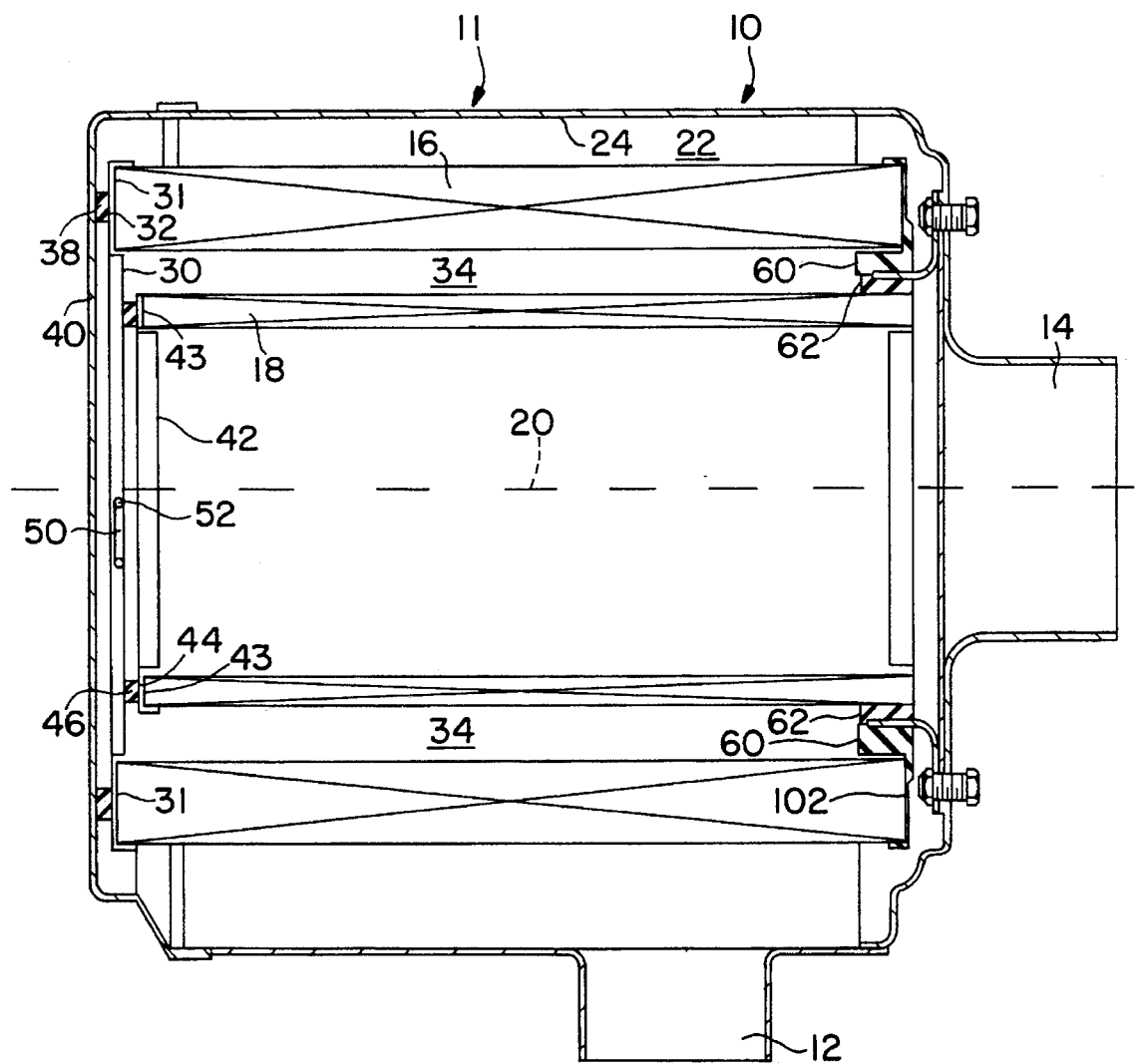
FIG. 1 is a side elevation of a filter assembly including filters configured in accordance with the principles of the instant invention.

Referring now to FIG. 1, there is shown a canister 10 having a radial inlet 12 and an axial outlet 14. Within the canister 10 there is a primary air filter 16 and a secondary air filter 18. The primary and secondary air filters 16 and 18 are coaxial about an axis 20 which is aligned with the outlet 14 of the housing. The secondary filter 18 is nested within the primary filter 16 so that air flowing through the inlet 12 fills the space 22 between the primary filter 16 and the cylindrical wall 24 of the housing 11. The air then flows radially through the primary filter 16 and the secondary filter 18 before flowing axially through the outlet 14.

Figure 7:
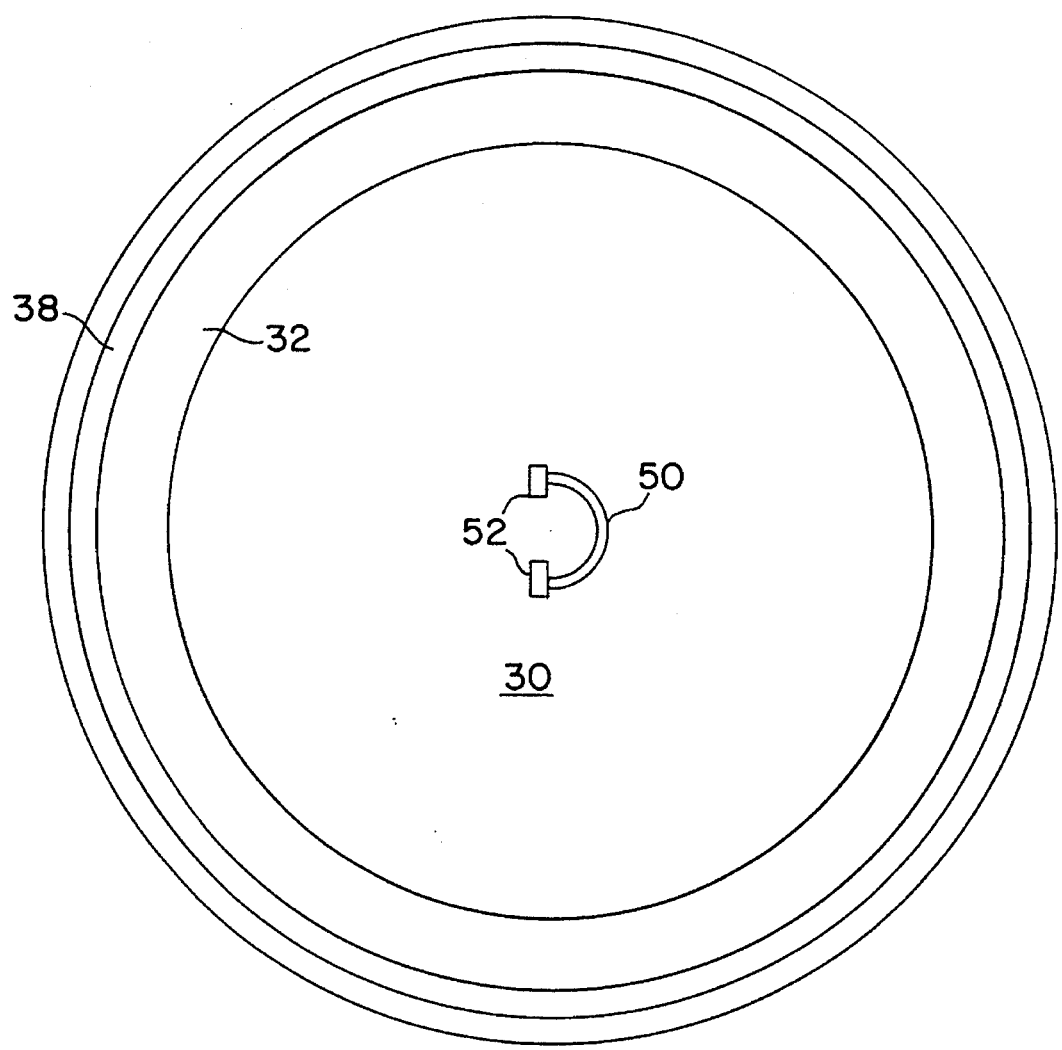
FIG. 7 is a rear planar view of an end plate for the primary filter element.

The primary and secondary filters 16 and 18 perform most effectively when the air is initially filtered by the primary filter and subsequently filtered by the secondary filter. In order to accomplish this, the primary and secondary filters are radially and axially isolated from one another. This is accomplished at one end of the primary filter 16 by having a circular end plate or pan 30 (see FIG. 7) heat bonded with a layer of plastisol 31 to corrugated filter paper within the primary filter 16. The end plate 30 fits over the annular rear end 32 of the primary filter 16 and covers the annular space 34 defined by the annular filter 16 (which also contains the secondary filter 18). An annular stop 38 of deformable elastic material is disposed between the end plate 30 and the removable end cover 40 of the housing 11 to provide a resilient stop for the primary filter 16.

Figure 8:
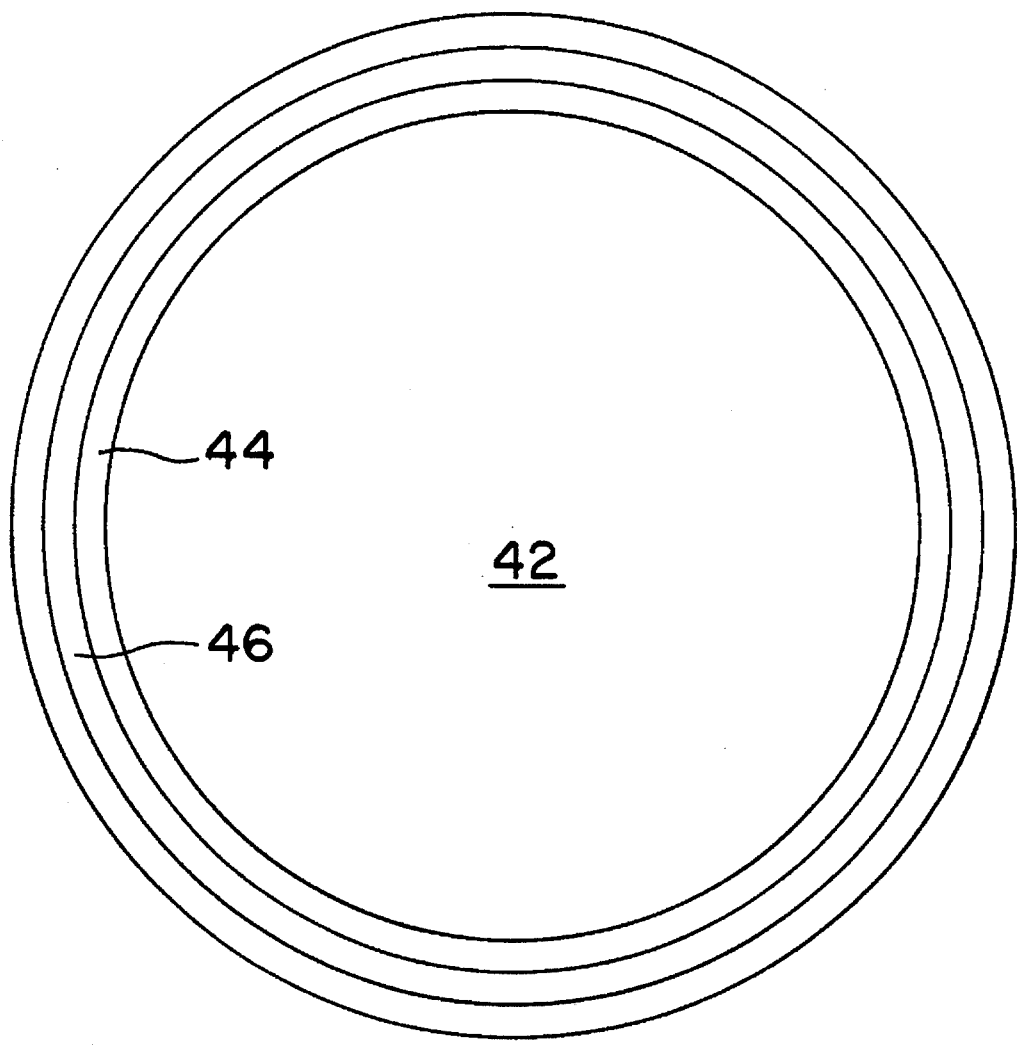
FIG. 8 is a rear planar view of an end plate for the secondary filter element.

A circular end plate or pan 42 (see FIG. 8) is provided to close the annular rear or second end 44 of the secondary filter 18. The circular end plate 42 is heat bonded to the filter 18 with a layer of plastisol 43 adhered to corrugated filter paper within the filter 18. An annular gasket and stop 46 of deformable elastic material is positioned between inner wall of the circular end plate 30 of the primary filter and the outer surface of the circular plate 42 on the secondary filter 18.

A loop 50 is affixed to the outer end plate 30 at a pivot 52 so as to facilitate extracting the primary filter 16 from the housing 11 upon removing the rear cover 40 from the cylindrical portion 24 of the housing. Once the relatively large primary filter 16 is extracted, there is room within the housing to reach in and pull the secondary filter 18 free. Since the filters 16 and 18 should be periodically changed, facilitating removal of the filters is very important.

At the front or first end of both the primary filter 16 and the secondary filter 18 are disposed annular seals 60 and 62, respectively. In accordance with the principles of the instant invention, the annular seals 60 and 62 are each made of relatively soft vulcanized rubber having a shore A durometer hardness about 35 to 40. A preferable vulcanized rubber is CM4403 polymer type EPDM rubber which is cured for 20 minutes at 350° F., has a hardness or shore A of about 50, a tensile psi of 1800–2000, an elongation percent of 700 to 800 and a specific gravity of 1.10/1.15. Seals 60 and 62 serve to radially position the secondary filter 18 within the primary filter 16 so as to maintain the annular space 34 between the primary and secondary filters while isolating the filters from one another. The seals 60 and 62 block axial movement of air from the annular space 34 to the outlet 14 so that the air, after being filtered by the primary filter 16, must flow through the secondary filter 18.

Figure 2:
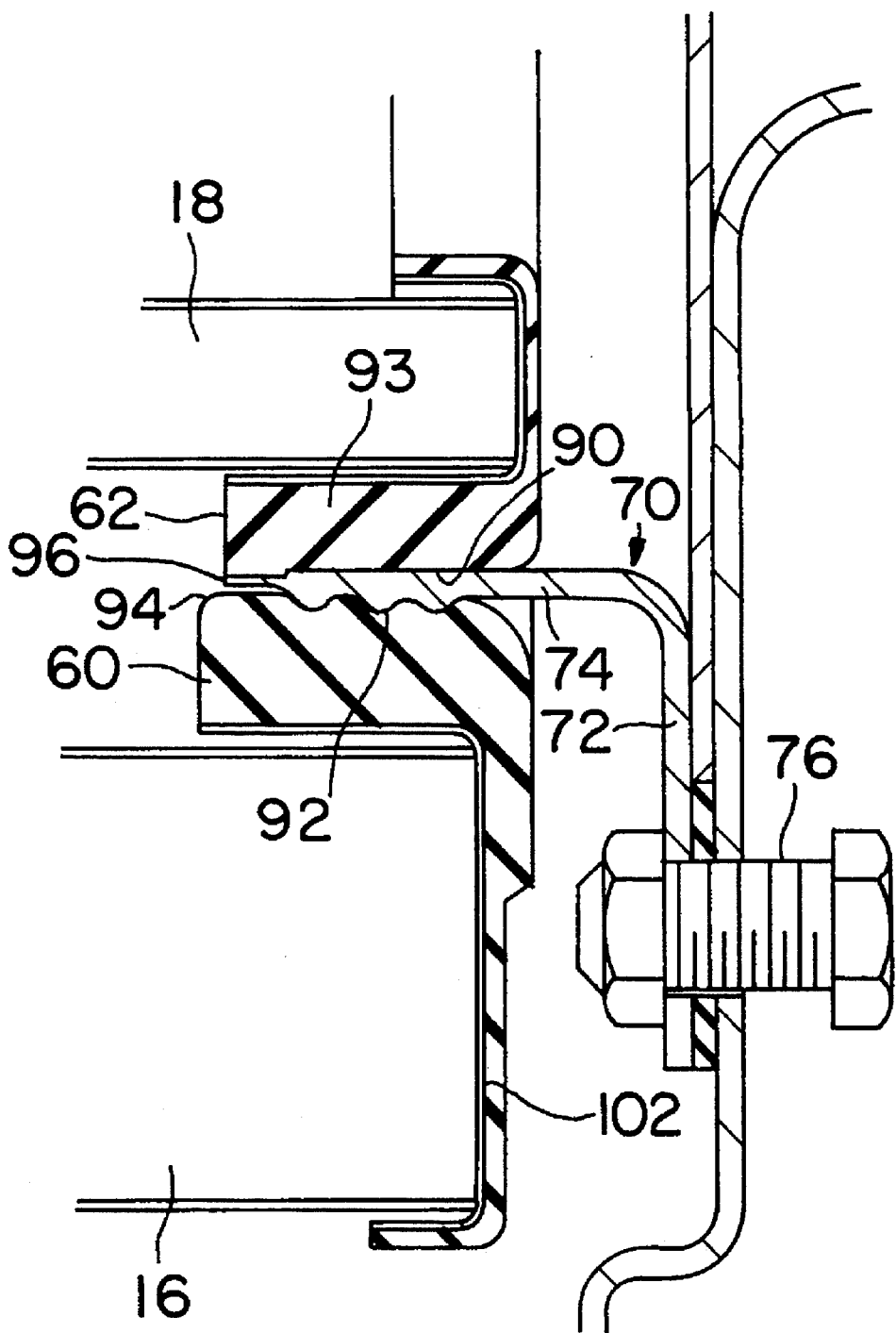
FIG. 2 is an enlarged elevation showing a portion of one end of the filter assembly of FIG. 1.

As is seen best in FIG. 2, an annular flange 70, having a radially extending portion 72 and an axially extending annual or circular projecting portion 74, is bolted by bolts 76 to the front end cover 78 of the housing 11. The axial portion 74 of the annular flange 70 extends between the rubber seal 60 on the primary filter 16 and the rubber seal 62 on the secondary filter 18.

The seal 62 has a smooth cylindrical exterior surface 90 abutted by the axial extending portion 74 of the flange 70 while the rubber seal 60 has a ribbed interiorally facing surface 92 which engages the axial portion of the flange. The surface 90 is formed on a shoulder portion 93 of the seal 62 which extends radially away from the filter 18. The surface 90 extends axially presenting an axially extending surface for forming a seal with the axially extending annular projection 74. These surfaces sandwich the axial projecting portion 74 of the flange 70 therebetween. On the rubber seal 60, there is an inwardly tapering semi-conical surface 94 which juxtaposes a surface 96 on the seal 62.

Figure 3:
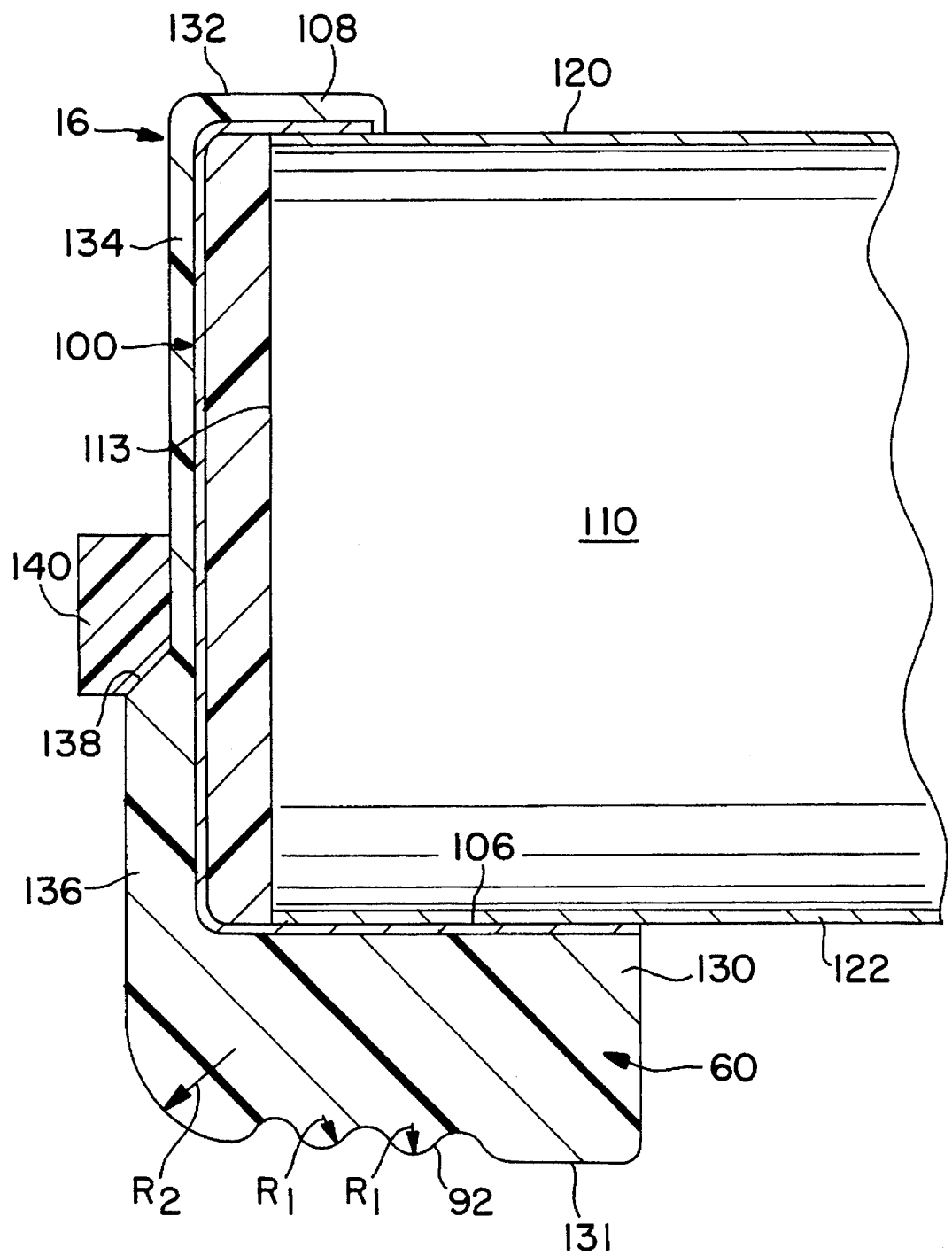
FIG. 3 is an enlarged elevation of a radial end seal of vulcanized rubber configured in accordance with the instant invention.
Figure 4:
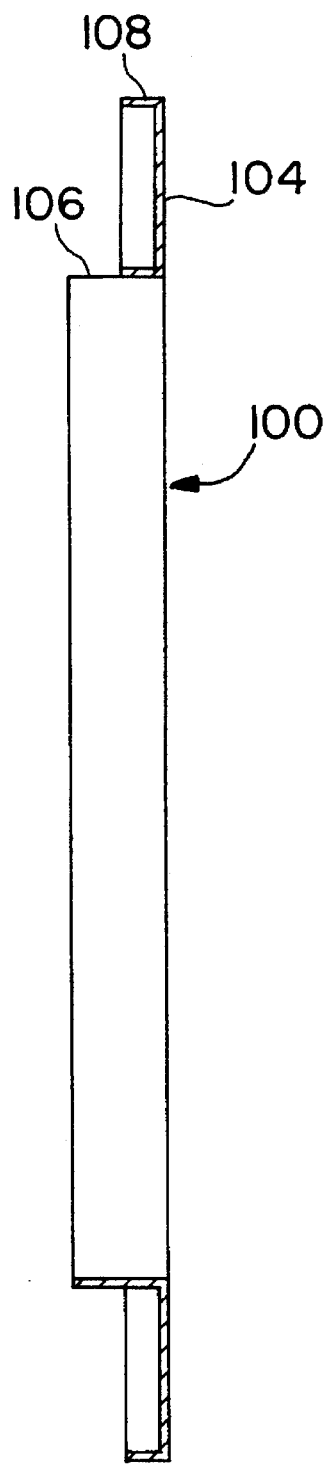
FIG. 4 is a side elevation of a metal end cap which fits over the end of the primary filter and supports the radial end seal of FIG. 3.

Referring now to FIGS. 3 and 4, it is seen that the seal 60 encapsulates the outer surface of an annular steel flange 100 (FIG. 4) which is generally U-shaped in cross-section and fits over the front end 102 (FIGS. 1 and 2) of the primary filter 16. Preferably, the seal 60 is bonded by a conventional, heat curable adhesive to the annular steel flange 100. The adhesive is applied to the plate 100 after the plate is cleaned. Upon vulcanizing the seal 60 with the plate 100 attached thereto, the adhesive is heat cured and bonds the seal to the plate.

Since the flange 100 is substantially U-shaped, it has a bite portion 104, a long leg portion 106 and a short leg portion 108. The bite portion 104 is bonded to a corrugated paper filter element 110 of the primary filter by a layer of heat bonding plastisol 112. The layer of plastisol 112 forms a clean straight bond with the annular face 113 of the corrugated filter paper 110, rather than leaking down into the interstices between the corrugated filter paper. It has been found that the annular steel flange 100 mechanically stabilizes the filter 16, allowing the filter to be easily inserted into the housing 11 (FIG. 1).

The corrugated filter paper 110 is retained between an outer annular screen 120 and an inner annular screen 122. The outer annular screen 120 is overlaid by the short leg 108 of the flange 100, while the inner annular screen 122 is overlaid by the longer leg 106 of the U-shaped flange.

The seal 60 has a relatively thick inboard portion 130 on which the inwardly facing ribs 92 are disposed. The thick portion includes a section of conical surface 131. A relatively thin outboard portion 132 is on the outer side of the filter 16. The relatively thin outboard portion 132 is joined by a radial portion 134 having a thickness the same as the outboard portion 132 and joins a relatively thick radial portion 136 via a 45° ramp 138. Disposed outboard of the thick radial portion 136 are three riser pads or nurdles 140 spaced circumferentially 120° apart and extending circumferentially less than about 5°. The pads might, in some situations, be engaged by the front cover of a housing in order to axially position the primary filter 16 within the housing.

In accordance with one example, for a filter element 16 which is approximately 12.5 inches in diameter, the inner cylindrical portion 130 has a thickness of about 0.5 inch, an axial length of about 1.06 inches and a slight taper. The radii $R_1$ of the ribs 92 is about 0.062 inch and a leading end radii $R_2$ of about 0.25 inch is provided. The thick radial portion 136 is about 0.156 inch, while the portions 134 and 132 have a thickness of about 0.05 inch. The height of the three risers 140 above the thick radial portion 136 is about 0.05 inch.

Figure 6:
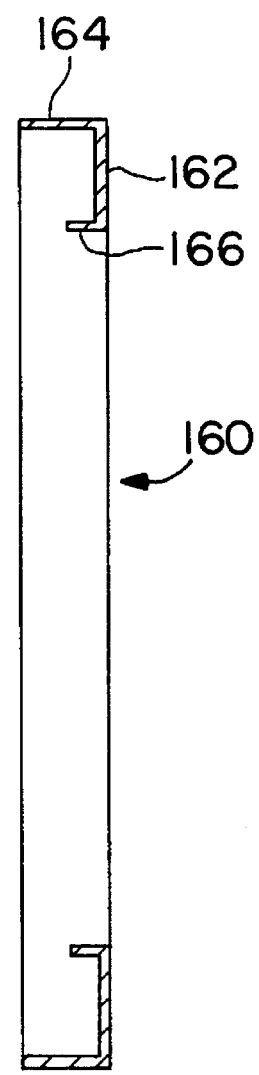
FIG. 6 is a side elevation of a metal end cap which fits over the end of the secondary filter and supports the seal of FIG. 5.
Figure 5:
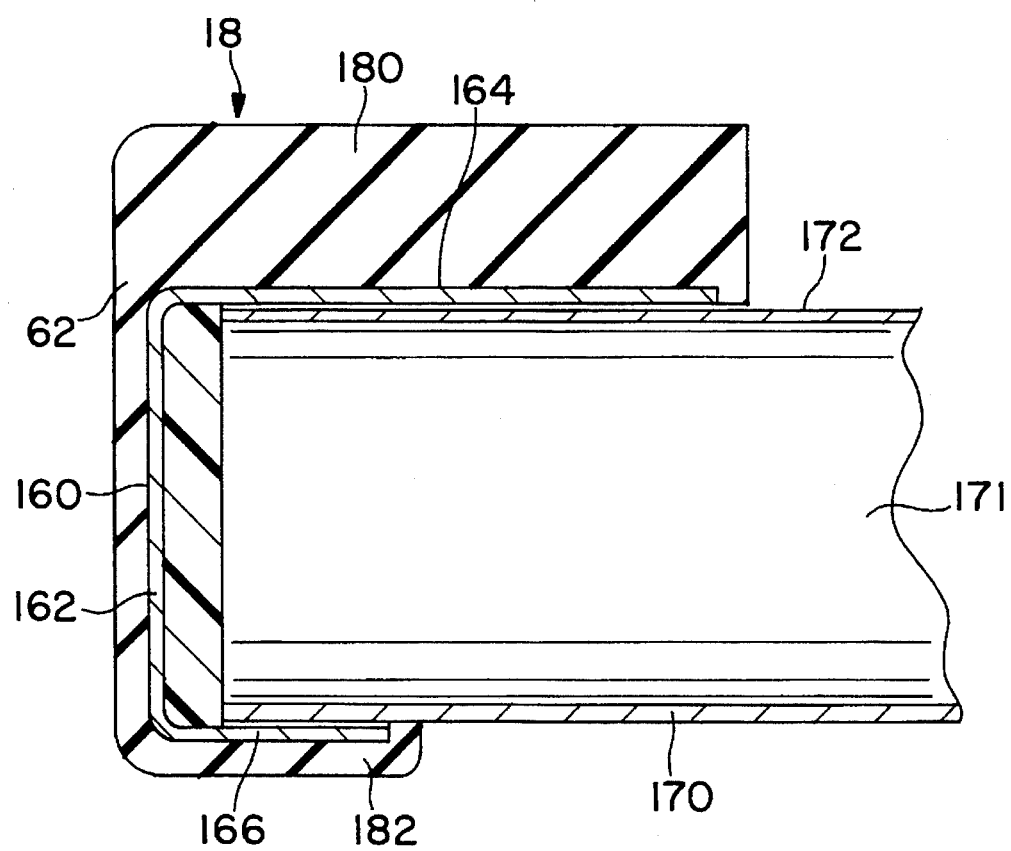
FIG. 5 is an elevation of a vulcanized rubber, annular end seal for a secondary filter element.

Referring now to FIGS. 5 and 6, where the seal 62 of the secondary filter 18 disposed within the primary filter 16 is shown, it is seen that the seal 62 is also mounted on a U-shaped flange 160. The U-shaped flange 160 has a bite portion 162, a long leg 164 and a short leg 166. As with the primary filter 16, the secondary filter 18 has a filter element 171 of corrugated paper material retained by an inner screen 170 and an outer screen 172. The inner and outer screens 170 and 172 are overlaid by the legs 166 and 164, respectively, of the U-shaped member 160, while the bite portion of the flange overlies the end of the filter.

In accordance with one example, the vulcanized rubber seal 62 has an external diameter of about 8.28 inches and an internal diameter of about 6.13 inches. The external cylindrical portion 180 of the seal 62 has a thickness of about 0.34 inches, while the inner cylindrical portion 182 and a radial end face 174 have a thickness of about 0.05 inch.

By using vulcanized rubber of a relatively soft durometer of 35–40 (for vulcanized rubber), the seals 60 and 62 have a long life and provide a structurally stiff filter which is relatively easy to install and remove.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an annular filter comprised of an annular element of filtering material disposed between a pair of concentric screens, the annular filter element having radially extending first and second end faces and being suitable for mounting in a housing having a bottom and a cover with an axially extending annular projection extending therefrom into the housing, the improvement comprising:

a metallic end cap having a radially extending annular portion for fitting over the first end face of the filter element;

the metallic end cap further having a radially, inner, axially extending portion and a radially, outer, axially extending portion, each portion extending over one of the cylindrical screens;

a layer of adhesive disposed between the radially extending portion of the metallic end cap and the first end face of the filter element for bonding the metallic end cap to the filter element;

a seal of relatively vulcanized rubber material overlying the metallic end cap and being bonded thereto wherein the vulcanized rubber comprising the seal has a shore A hardness of about 35 to 50 durometer;

the seal having a radially disposed position with an axially facing outer end and axially facing inner end facing away from the outer end;

the radially disposed portion having a frustoconical surface proximate the inner end and a plurality of annular ribs proximate the outer end.

2. The improvement of claim 1, wherein the filter has a round metal end plate fixed over the second end thereof, the round end plate having an annular resilient stop thereon disposed in alignment with the end face of the annular element of filter material.

3. The improvement of claim 2, wherein a looped handle is positioned at the center of the round plate.

4. The improvement of claim 1, wherein the filter has a circular plate disposed proximate its second end, the round plate having thereon an annular sealing element which is in alignment with the end face of the annular element of filter material.

5. The improvement of claim 4, wherein the filter is a secondary filter.

6. The improvement of claim 5, wherein the secondary filter has an internal diameter of about 6 inches and an external diameter of about 8 inches.

7. The improvement of claim 1, wherein the filter is a primary filter.

8. The improvement of claim 7, wherein the filter has an outside diameter of approximately 12.5 inches and an inside diameter of approximately 8.3 inches.

9. The improvement of claim 1, wherein one of the axially extending portions has a length greater than the other axially extending portion.

10. In an annular filter comprised of an annular element of filtering material disposed between a pair of concentric screens, the annular filter element having radially extending first and second end faces and being suitable for mounting in a housing having a bottom and a cover with an axially extending annular projection extending therefrom into the housing, this improvement comprising:

a metallic end cap having a radially extending annular portion for fitting over the first end face of the filter element;

the metallic end cap further having an inner, axially extending portion and an outer, axially extending portion, each portion extending over one of the cylindrical screens;

a layer of adhesive disposed between the radially extending portion of the metallic end cap and the first end face of the filter element for bonding the metallic end cap to the filter element; and a seal of relatively soft vulcanized rubber material overlying the metallic end cap and being bonded thereto, wherein the seal has a relatively thick outboard portion with a smooth axially extending surface for engaging one side of the axially extending annular projection and a radially extending shoulder with an axially extending surface for forming a stop with the axially extending annular projection.

11. The improvement of claim 10, wherein one of the axially extending portions has a length greater than the other axially extending portion.

* * * * *